(12) United States Patent
Karpman et al.

(10) Patent No.: US 8,090,456 B2
(45) Date of Patent: Jan. 3, 2012

(54) SYSTEM AND METHOD FOR DESIGN AND CONTROL OF ENGINEERING SYSTEMS UTILIZING COMPONENT-LEVEL DYNAMIC MATHEMATICAL MODEL

(75) Inventors: Boris Karpman, Marlborough, CT (US); Richard P. Meisner, Glastonbury, CT (US); Mark E. Lacour, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 556 days.

(21) Appl. No.: 12/264,014

(22) Filed: Nov. 3, 2008

(65) Prior Publication Data

US 2011/0077783 A1 Mar. 31, 2011

(51) Int. Cl.
*G06F 19/00* (2006.01)
(52) U.S. Cl. .............................. 700/45; 700/30; 700/282
(58) Field of Classification Search .................. 700/28, 700/29, 30, 32, 33, 34, 37, 44, 45, 52, 54, 700/282, 283, 287; 60/39.281, 772, 790; 701/100, 101
See application file for complete search history.

(56) References Cited

U.S. PATENT DOCUMENTS

| | | | |
|---|---|---|---|
| 3,686,859 A * | 8/1972 | White ............................ 60/790 |
| 4,040,250 A * | 8/1977 | Saunders et al. ............ 60/39.281 |
| 4,215,412 A | 7/1980 | Bernier et al. |
| 4,809,500 A | 3/1989 | Roberts, Jr. |
| 5,189,620 A | 2/1993 | Parsons et al. |
| 5,197,280 A | 3/1993 | Carpenter et al. |
| 5,212,943 A * | 5/1993 | Harris ............................ 60/790 |
| 5,303,142 A | 4/1994 | Parsons et al. |
| 5,448,881 A | 9/1995 | Patterson et al. |
| 5,857,321 A | 1/1999 | Rajamani et al. |
| 6,016,465 A * | 1/2000 | Kelly ............................ 702/116 |
| 6,063,129 A | 5/2000 | Dadd et al. |
| 6,393,355 B1 | 5/2002 | Muramatsu |
| 6,625,987 B2 | 9/2003 | Pisano et al. |
| 6,715,277 B2 * | 4/2004 | Zagranski et al. .......... 60/39.281 |
| 6,823,253 B2 | 11/2004 | Brunell |
| 6,823,675 B2 | 11/2004 | Brunell et al. |
| 6,860,712 B2 | 3/2005 | Pisano et al. |
| 7,136,738 B2 * | 11/2006 | Zagranski et al. ............ 701/100 |
| 7,472,100 B2 * | 12/2008 | Volponi et al. ................. 706/45 |

(Continued)

FOREIGN PATENT DOCUMENTS

GB 2214331 A 8/1989

(Continued)

OTHER PUBLICATIONS

The extended European Search Report of counterpart foreign Application No. 10163183.6 filed Apr. 23, 2010.

*Primary Examiner* — Charles Kasenge
(74) *Attorney, Agent, or Firm* — Kinney & Lange, P.A.

(57) ABSTRACT

A control system comprises a controller for positioning an actuator in a working fluid flow and a model processor for directing the controller as a function of a model feedback. The model processor comprises an output module, a comparator and an estimator. The output module generates the model feedback as a function of a constraint, a model state and a model input describing fluid parameters measured along the working fluid flow. The comparator generates an error by comparing the model feedback to the model input. The estimator generates the constraint and the model state, such that the error is minimized.

25 Claims, 5 Drawing Sheets

U.S. PATENT DOCUMENTS

| | | |
|---|---|---|
| 7,621,716 B2 | 11/2009 | Regunath |
| 2003/0094000 A1 | 5/2003 | Zagranski et al. |
| 2004/0093151 A1 | 5/2004 | Zagranski et al. |
| 2005/0193739 A1* | 9/2005 | Brunell et al. .......... 60/772 |
| 2006/0051197 A1 | 3/2006 | Regunath |

FOREIGN PATENT DOCUMENTS

| | | |
|---|---|---|
| WO | 03023538 A2 | 3/2003 |

* cited by examiner

SYSTEM AND METHOD FOR DESIGN AND CONTROL OF ENGINEERING SYSTEMS UTILIZING COMPONENT-LEVEL DYNAMIC MATHEMATICAL MODEL

STATEMENT OF GOVERNMENT INTEREST

Subject matter disclosed in this application was produced with U.S. Government support under Contract No. N00019-02-C-3003, awarded by U.S. Navy. The U.S. Government may have certain rights in this invention.

BACKGROUND OF THE INVENTION

The subject matter of this application relates generally to the design and control of engineering systems. Across a broad range of industries, modern engineering systems are characterized by marked increases in complexity and simultaneous decreases in component tolerances. As a result, engineering control systems are subject to greater operational demands, which require more sophisticated and detailed modeling techniques.

Fluid-based engineering systems provide a range of relevant examples. These include gas turbine engines for aviation and power generation, HVAC&R (heating, ventilation, air-conditioning and refrigeration), fuel cells, and other, more generalized fluid processing systems for hydrocarbon extraction, materials processing, and manufacture. These systems contain any or all of the following components: turbo-machinery, fuel cell stacks, electric motors, pipes, ducts, valves, mixers, nozzles, heat exchangers, gears, chemical apparatuses and other devices for generating or modifying a fluid flow.

Each of these applications places different operational demands on the engineering control system. In gas turbine engine applications, for example, the relevant cycle is typically a Brayton turbine or first Ericsson cycle, and the basic thermodynamic parameters (or process variables) are the pressure, temperature and flow rate of the working fluid at the inlet, compressor, combustor, turbine, and exhaust. The parameters are related to the overall thrust, rotational energy, or other measure of power output. In order to precisely control this output while maintaining safe, reliable and efficient engine operation, the engineering control system must be fast, accurate and robust, and provide real-time control capability across all required performance levels. While the relevant process variables vary depending on the system type and configuration, the need for precise, efficient and reliable engineering control remains the same, as do the economic constraints on overall cost and operational/maintenance requirements.

BRIEF SUMMARY OF THE INVENTION

This disclosure concerns a system and a method for design and control of an apparatus. The system utilizes a control law to control actuators that position control elements of the apparatus, as a function of a model output vector generated by a component-level physics-based mathematical model of the apparatus. The system also includes diagnostics and fault detection/accommodation software modules.

The model comprises mathematical descriptions of interconnected components and constraints that combine to produce the output vector and a physics state derivative, as a function of a constraint input and an external input vector. The constraint output is related to internal system, and the external input vector is related to effector/actuator states and boundary conditions of the apparatus. A comparator checks a subset of the output vector against a "truth" vector represented by measured or high fidelity modeled data, in order to generate an error vector. The discrete model state estimator synthesizes (estimates) next time step values of the state vector, including both constraint and physics subsets, such that the error vector is minimized.

In the case of a gas turbine or other flow-processing apparatus, the method provides means for controlling physics states, including rotational states, for given working fluid flow conditions at an inlet and an outlet. The method also provides means for adjusting the position of control elements along the working fluid flow, using actuation mechanisms and a digital control system built around the dynamic component-level mathematical model.

DETAILED DESCRIPTION

Figure 1:
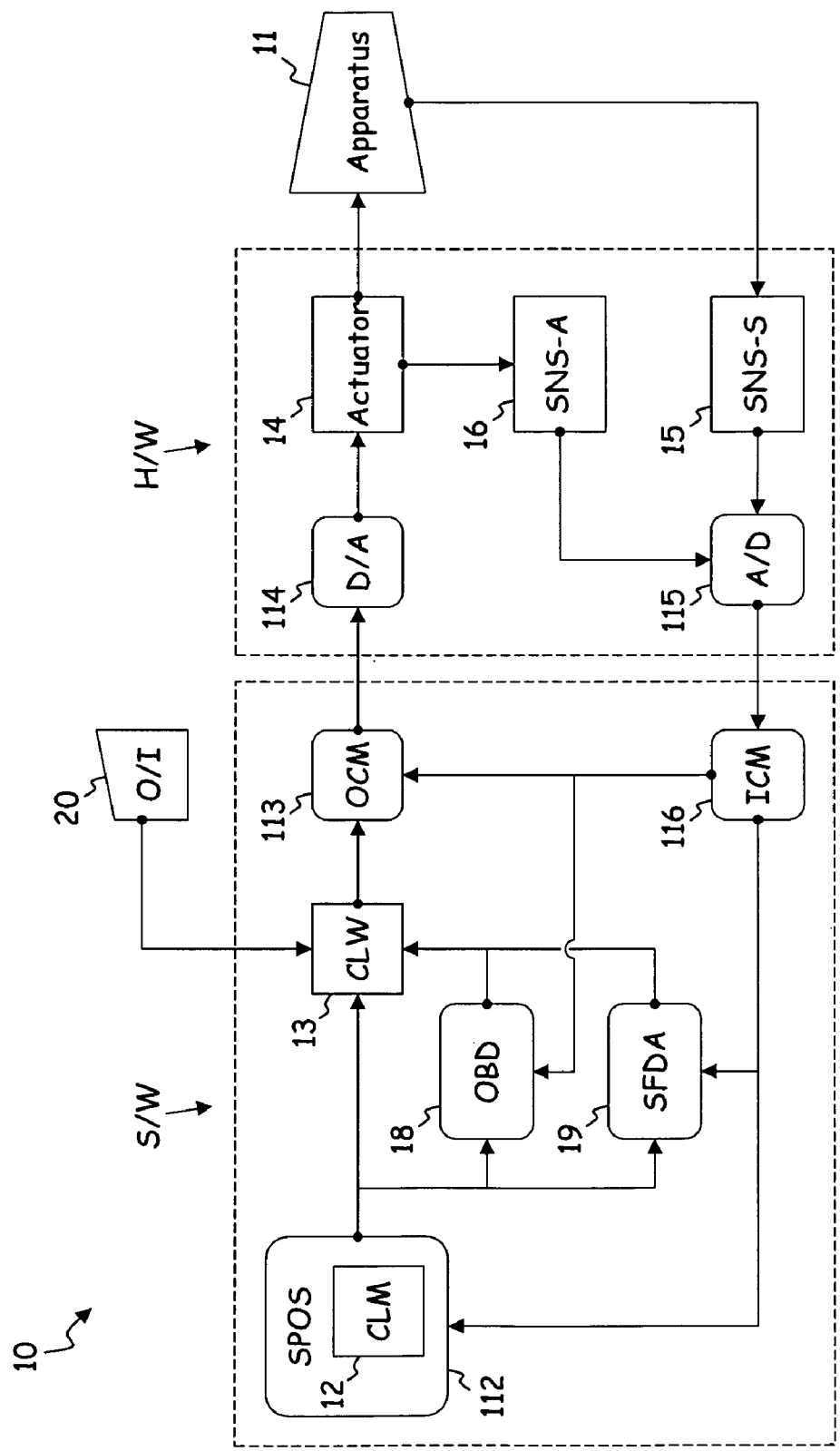
FIG. 1 is a schematic diagram of a control system with a closed-loop model processor and a discrete model state estimator.

FIG. 1 is a schematic diagram of digital control system 10 for apparatus 11. Control demands for apparatus 11 are generated by operator interface (I/F) 20, and satisfied by utilizing the components of system 10 to control apparatus (or engineering system) 11.

In general, system 10 includes at least some of the following software (S/W) modules: system parameter on-board synthesis (SPOS) module 112, control law (CLW) 13, on-board diagnostics (OBD) module 18, sensor fault detection and accommodation (SFDA) module 19, output conditioning module (OCM) 113, and input conditioning module (ICM) 116. These modules are incorporated in a "black box" type processor assembly mounted proximate apparatus 11, or in a number of individual processors. SPOS 112 is build around a component-level mathematical model of apparatus 11, also referred to as closed loop model (CLM) 12, such that CLM 12 is a subset of SPOS 112. System 10 also incorporates at least some of the following hardware (H/W) elements: digital-to-analog (D/A) converter 114, analog-to-digital (A/D) converter 115, actuator(s) 14, system sensor(s) 15, actuator sensor(s) 16.

As shown in FIG. 1, CLW 13 obtains control feedbacks from CLM 12/SPOS 112 and control commands (the desired values of outputs from apparatus 11) from operator interface (UF) 20. CLW 13 generates control requests in engineering units, which are transformed into actuator requests compatible with D/A converter 114 by OCM 113. D/A converter 114 generates electrical signals that operate on actuators 14. Actuators 14 use control hardware to position various control elements of apparatus 11 in accordance with the control request, resulting in quick and accurate control of apparatus 11.

System sensors 15 measure operational parameters associated with apparatus 11. For example, fluid-based systems often include system sensors 15 that measure the working fluid pressure, temperature and flow at various axial and radial locations in the flow path. Actuator sensors 16 measure the state of actuators 14, where the actuator states (or positions) are related to the physical configuration of the various control elements in apparatus 11. For example, fluid-based systems often include actuators whose linear or angular positions are sensed by actuator sensors 16, and which are related to the physical position of control surfaces or other control devices located proximate a compressor, combustor, turbine or nozzle/exhaust assembly.

Sensor hardware modules 15 and 16 send electrical signals to A/D converter 115, which converts the electrical signals into a digital format compatible with the software and hardware architecture of control system 10. ICM 116 filters the raw signals and transforms them into engineering units compatible with the control system software architecture. In some embodiments, CLM 12 also communicates with CLW 13 via one or more SFDA module 19 and OBD module 18.

Apparatus 11 comprises an engineering system such as a gas turbine engine, an environmental control system or a fluid processing system. In various embodiments, the physical components of apparatus 11 include, but are not limited to, compressors, combustors, turbines, shafts, spools, fans, blowers, heat exchangers, burners, fuel cells, electric motors and generators, reactor vessels, storage vessels, fluid separators, pipes, ducts, valves, mixers and other fluid processing or flow control devices.

CLM 12 comprises elements designed to provide a component-level dynamic mathematical model of apparatus 11, utilizing a mixture of physics-based and data-derived descriptions of the individual physical components of apparatus 11. CLM 12 also models relationships among these components, including operational constraints based on physics and engineering considerations. That is, CLM 12 models not only the engineering components of apparatus 11, but also the physical laws that govern their behavior.

Operator I/F 20 comprises a real-time interface such as a cockpit navigation system or operator workstation. Alternatively, operator I/F 20 comprises another, more generalized process control interface, which is suitable for logging control commands to CLW 13.

CLW converts the control demands to control requests for actuators 14, which satisfy the control requests by changing the operational configuration of apparatus 11. Some actuators 14, for example, change the configuration of a fuel flow controller, a variable vane surface, or another control surface positioned along a fluid flow inside apparatus 11. Other actuators 14 change the state, position or configuration of additional devices for controlling the operation of apparatus 11, including, but not limited to, fuel pumps, variable compressor or turbine vanes, variable-area nozzle, inlet or bypass duct elements, and variable-area orifice elements.

System sensors 15 comprise a variety of different sensing devices, including, but not limited to, temperature sensors, pressure sensors, flow sensors, vibration sensors, debris sensors, current sensors, voltage sensors, level sensors, altitude sensors and blade tip sensors. System sensors 15 are positioned to measure operational parameters related to the function of apparatus 11, in particular as related to control commands submitted to CLW 13 and control requests generated by CLW 13, in order to direct actuators 14 to control apparatus 11.

In some embodiments, CLM 12 communicates with CLW 13 both directly and via one or more of OBD module 18 and SFDA module 19. Modules 18 and 19 monitor the state of system hardware including actuators 14, sensor modules 15 and 16, and apparatus 11. For example, the health of apparatus 11 and system sensors 15 is assessed based on a comparison of sensor values with the predictions of CLM 12. The health of actuators 14 and actuator sensors 16 is assessed based on the difference between requested and sensed actuator positions.

Under some conditions, OBD module 18 and SFDA module 19 allow CLW 13 to compensate for operationally-dependent changes in actuator response, including changes due to variations in temperature, pressure and power input or output. Modules 18 and 19 also utilize system parameters synthesized by CLM 12 to correct or recalibrate aberrant sensor signals, in order to provide more accurate and stable input to CLW 13. Alternatively, modules 18 and 19 replace failed sensor signals with synthesized values from CLM 12, or allow CLW 13 to deploy one actuator (or set of actuators) in order to compensate for another actuator (or set of actuators) that has failed. In these embodiments, SFDA module 19 typically generates a real-time alarm signal or other fault indicator, such as a fuel status warning, a damage report, a temperature alarm or a maintenance request.

Typically, apparatus 11 performs a thermodynamic cycle on a working fluid in order to generate rotational energy, electrical power or reactive thrust, to provide heating, ventilation, air conditioning and refrigeration, or to perform other fluid processing functions. The range of available cycles includes, but is not limited to, the following cycles and their derivatives: Otto cycles, Diesel cycles, Brayton turbine (or first Ericsson) cycles, Brayton jet (Barber/Joule) cycles, Bell-Coleman (reverse Brayton) cycles, Ericsson (second Ericsson) cycles, Lenoir (pulse-jet) cycles, and Carnot, Stoddard and Stirling cycles.

Alternatively, apparatus 11 performs a number of individual thermodynamic processes for heating, cooling, flow control, or for processing applications in agriculture, transportation, food and beverage production, pharmaceutical production, or manufacturing, or for the extraction, transportation or processing of a hydrocarbon fuel. The range of available thermodynamic processes includes, but is not limited to, adiabatic, isothermal, isobaric, isentropic, and isometric (isochoric or isovolumetric) transformations, exothermic reactions, endothermic reactions and phase changes.

In operation of system 10, CLW 13 receives a control command from real-time operator I/F 20, and a control feedback or model output from CLM 12. The control command is related to the operation of apparatus 11, and the feedback is related to the control command. In one embodiment, for example, apparatus 11 comprises a gas turbine engine, and the command comprises an operator-generated demand for increased engine power or thrust output. Alternatively, the request is automatically generated by system 10, or by another control system, in response to changing ambient conditions or operational demands.

Control signals are transmitted in either digital or analog form, depending upon the characteristics of control system 10. For example, CLW 13 typically generates a digital control request in engineering units. OCM 113 converts the digital request into units compatible with D/A converter 114, which in turn generates an electrical signal such as voltage or current for actuator 14. Typical examples include analog voltage signals for a fuel pump, analog current signals for a valve controller, and pulsed digital signals for a stepper motor or other mechanical actuator. The actuator is attached to a variable-position control device located within apparatus 11, such as a variable-position blocker door for a bypass duct, a variable-position vane, or a variable-geometry exhaust nozzle. Compound signals are sometimes utilized for more complex actuator systems, such as fuel, oxidant and cooling fluid flows through a thrust augmentor/afterburner assembly, counter-rotating fan thrust and attitude control signals for STOVL (short takeoff or vertical landing) operations, or flow management through a regenerator, heat exchanger, reaction vessel, catalytic converter or other component of a fluid processing system.

Actuators 14 address the control request by manipulating or adjusting one or more control devices (or control elements) within apparatus 11. Apparatus 11 responds to the action of actuators 14, such that the control command provided to CLW 13 is satisfied. For the case of a gas turbine, these manipulations take a variety of forms, including changes in the fuel flow or other fluid flow rate, changes in vane, bypass duct or nozzle configurations, and other changes in the configuration of apparatus 11. The typical responses of apparatus 11 include an increase or decrease in total thrust or power output, changes in a cooling flow or fluid processing rate, and on/off switching of supplementary systems such as counter-rotating fans, regenerators and heat exchangers.

System sensors 15 sense parameters related to the operation of apparatus 11. In particular, these parameters are related to the control requests raised by CLW 13, and the response of actuators 14. Typical sensor parameters include, but are not limited to, positions, velocities, acceleration, currents, and voltages, rotational speeds of spools or shafts, fuel flow rates, working fluid flow rates, power input, power output, and pressures and temperatures proximate various components of apparatus 11, such as inlets, outlets, compressors, combustors, turbines, exhaust systems, reaction or storage vessels and flow conduits. Additional sensors such as altimeters, air speed indicators or accelerometers are sometimes utilized to determine higher-order operational parameters such as thrust, climb or Mach number. In some embodiments, these higher-order parameters are directly measured by a particular sensor or sensor group. In other embodiments, including virtual sensor embodiments, higher-order parameters are calculated as a function of lower-order (directly measured) parameters.

The conditions of actuators 14 and apparatus 11 are represented by sensors 15 and 16 in software form, and made available to any of CLM 12, CLW 13, OBD 18 and SFDA 19 via ICM 16, providing an accurate assessment of the control influences acting on apparatus 11. In the case of an increased thrust request for a gas turbine engine, for example, CLM 12 directs CLW 13 to control actuators 14 in order to increase the fuel flow rate, and to change the position of various vane and nozzle components along the working fluid flow path through apparatus 11. Apparatus 11 responds with faster spool rotation, higher flow and increased exhaust temperature and pressure, which is sensed by system sensors 15 and reflected by synthesized system parameters generated by CLM 12.

In operation of system 10, CLW receives control demands from operator I/F 20 and converts them into control requests for OCM 113, as described above. CLM 12 directs CLW 13 to dynamically adjust the control requests as a function of feedback or model output that represents the real-time operational condition of apparatus 11. The feedback signals include operational parameters related to specific control commands, such as commands related to shaft speeds and fuel flow rates. This allows system 10 to satisfy each control demand and control request quickly and accurately, without overshooting or oscillating about the target value. In some embodiments, CLM 12 also generates diagnostic and fault outputs for OBD 18 and SFDA 19.

System 10 and CLM 12 provide fast, accurate and robust response to real-time control commands. In particular, CLM 12 utilizes nonlinear functions to provide faster convergence and lower response time than other, highly iterative techniques, or that rely on linear, piecewise linear and "lightly" non-linear estimates, rather than fully non-linear state variable functions. This allows system 10 to provide greater operating efficiency, particularly when apparatus 11 is subject to highly variable loads and unstable operational configurations.

In general, CLM 12 is comprised within a "black-box" processor mounted proximate apparatus 11, as described above. CLM 12 communicates with CLW 13, system sensors 15, actuator sensors 16 and the other elements of system 10, as shown in FIG. 1, and estimates model states non-iteratively, with execution speed sufficient to provide stable and responsive control of apparatus 11.

In gas turbine engine embodiments, system 10 is applicable to a range of FADEC (full authority digital engine control) or "fly-by-wire" aviation applications, including STOVL operations for high-performance military aircraft. In these embodiments, apparatus 11 typically comprises a low-bypass turbofan engine having a core flow length on the order of a few meters. In further embodiments, the turbofan is configured for afterburning operations, and operates under conditions of choked inlet flow and substantially transonic or sonic core flow.

Figure 2:
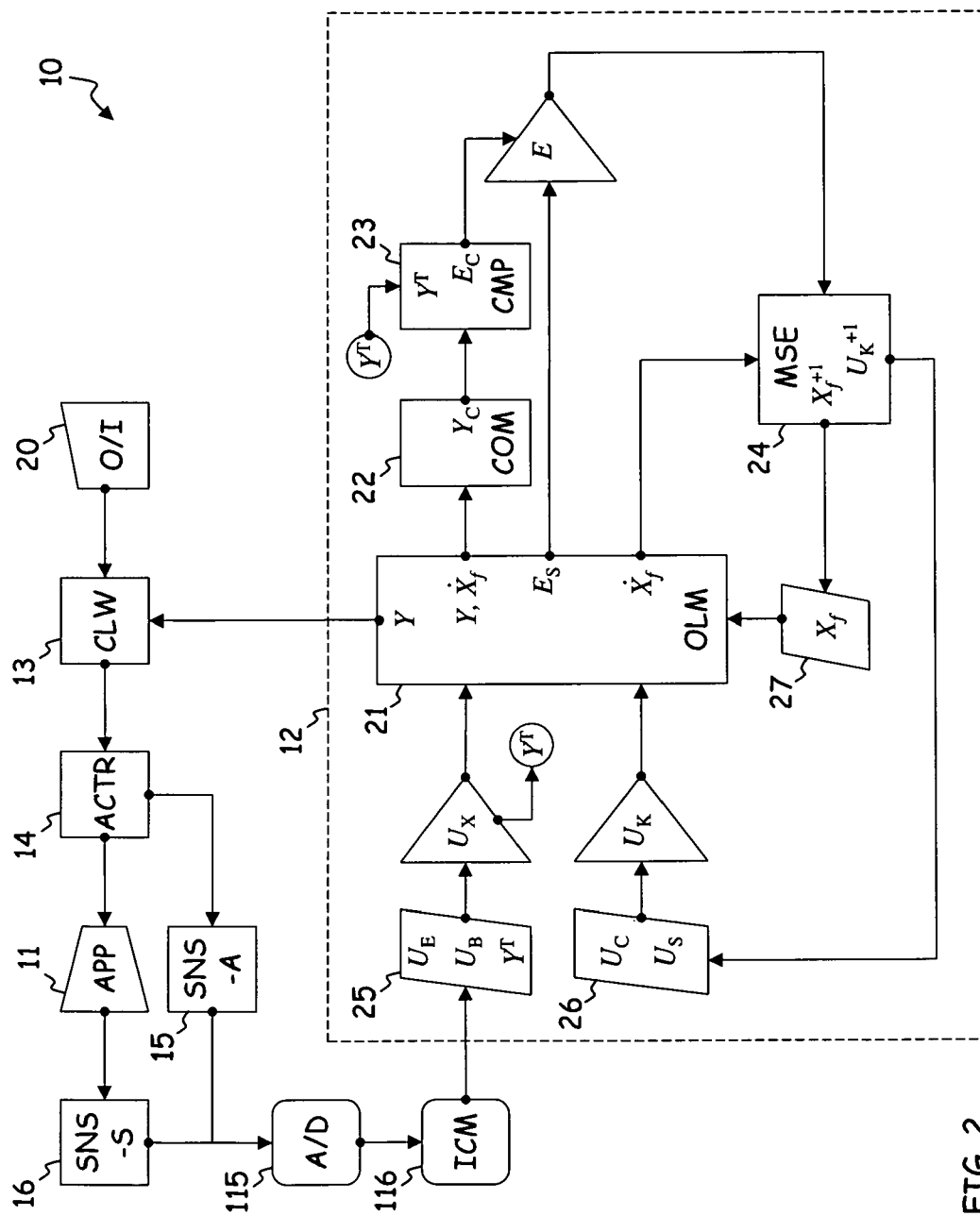
FIG. 2 is a schematic diagram showing the model processor of FIG. 1.

FIG. 2 is a schematic diagram of CLM 12 for control system 10. CLM 12 comprises a number of modular software elements, including open-loop module (OLM) 21, corrector output module (COM) 22, comparator module (CMP) 23 and model state estimator (MSE) 24. These elements operate in concert to provide system 10 with fast, accurate and stable control of apparatus 11.

Closed-loop model 12 receives external inputs 25 from sensor modules 15 and 16, via the A/D converter 115 and ICM 116. Inputs 25 comprise effecter vector $U_E$, truth vector $Y_T$ and boundary conditions $U_B$, which are combined to form external input vector $U_X$.

Effector vector $U_E$ describes the configurations, positions and states of various control elements in apparatus 11. In a gas turbine engine, for example, individual elements of effector vector $U_E$ describe fuel flow rates, nozzle areas, variable vane angles, flow path orifice areas, and other control element parameters.

In real-time execution of control system 10, truth vector $Y_T$ describes the actual (sensed) values of parameters related to the operation of apparatus 11. The elements of truth vector $Y_T$ are based on measurements by sensors 15 and 16, or, alternatively, a well-understood and trusted model of sensed parameters, such as a flow rate model based on a differential pressure drop across a Pitot tube or Venturi tube. For gas turbine engines, typical truth vector elements describe spool speeds and gas path temperatures or pressures proximate engine components such as compressors, combustors and turbines. In the context of non-real time applications, including calibration, truth vector $Y_T$ corresponds to high fidelity data which can either be physical tested or is model-based.

The elements of boundary vector $U_B$ describe boundary conditions related to the operation of apparatus 11. Some boundary conditions are directly measured by system sensors 15, such as fluid temperatures, pressures and flow rates at physical boundaries of apparatus 11. In fluid-based applications, the boundary conditions include boundary flow conditions at inlet and outlet locations. Other boundary conditions specific to aircraft applications include, but are not limited to, flight velocity, altitude, and bleed or power extractions parameters.

In addition to external inputs 25, OLM 21 also operates on states of CLM 12. These states include two major subsets, which are referred to as constraint input states 26 ($U_K$) and physics states 27 ($X_f$). Constraint input states 26 ($U_K$) comprise corrector subset $U_C$ and solver subset $U_S$. Constraint corrector states $U_C$ are used to correct subset $Y_C$ of outputs Y, and constraint solver states $U_S$ are used to minimize solver errors $E_S$. Physics states 27 ($X_f$) comprise a subset of dynamic states of apparatus 11, whose elements are determined based on their impact on the dynamic fidelity of CLM 12. Physics states 27 ($X_f$) typically exhibit relatively slow dynamics with respect to the execution speed of CLM 12, which is limited by the digital control system hardware (that is, the capability of the "black box" processor or other computing platform).

Compared to physics states $X_f$, constraint input states $U_K$ are generally characterized by a faster time scale, for example the time scale associated with inter-component fluid volumes in a gas turbine engine or other fluid processing system. In particular, the latency time for elements of constraint input states $U_K$ is by definition less than the execution speed of CLM 12, outside the dynamic range of physics states $X_f$, and does not affect the fidelity of model outputs from CLM 12 that impact the quality of control system 10.

Constraint corrector states $U_C$ form a vector of adjustable model parameters utilized to correct a subset of model outputs $Y_C$ from COM 22, such that they match corresponding elements of truth vector $Y_T$. The model parameters include both physics and engineering considerations, and empirical relationships based on actual operating conditions. Corrector outputs $Y_C$ and truth vector $Y_T$ are compared within a particular tolerance defined by comparator (CMP) 23, which outputs the difference by generating error corrector vector $E_C$. Corrector errors $E_C$ are combined with solver errors $E_S$ to produce error vector E. Essentially, CLM 12 seeks constraint vector $U_K$ that drives both subsets of error vector E to zero.

Constraint solver states $U_S$ impose both system and component constraints on CLM 12. In contrast to physics states $X_f$, these constraints often, but not always, are based on physical laws of flow continuity, thermodynamics, and other engineering limitations. This also contrasts with constraint corrector states $U_C$, which are model-adjustable parameters meant to compensate for incorrectly modeled and/or omitted physics phenomena, and not always based on physics and engineering principles.

In the case of gas turbine-based systems, the elements of physics state vector $X_f$ describe "important" states such as spool speeds, which directly affect the transient fidelity of the CLM 12 through their direct impact on outputs corresponding to control commands such as thrust commands. There is also a subset of physics states $X_f$ that is not directly sensed, but nevertheless is modeled in CLM 12, such as metal temperatures along a hot gas flowpath. The relatively long response time for physics model states $X_f$ contrasts with the relatively short latency time of constraint corrector states $U_C$ and corrector outputs $Y_C$, which correspond to faster dynamical variables including flowpath temperatures and pressures.

Additional outputs Y do not necessarily correspond to parameters that are directly measured or controlled, for example gas path parameters in locations where it would be difficult, expensive or dangerous to place physical sensor devices. Further outputs Y are generalized outputs, which do not necessarily correspond to any particular physical quantity at all. Some generalized outputs are nonetheless empirically useful as inputs to CLW 13, because they allow system 10 to more quickly and accurately satisfy particular control commands.

OLM 21 also generates physics state vector derivatives defined by:

$$\dot{X}_f \equiv \frac{dX_f}{dt}, \quad [1]$$

as well as solver error vector $E_S$. Physics state vector derivatives $\dot{X}_f$ model the time rates of change of physics state vectors $X_f$, which are generated by model state estimator 24, below. Solver errors $E_S$ are most often associated with constraint solver states $U_S$ via physics and engineering-based constraints, including energy conservation, mass conservation and flow continuity. COM 22 forms corrector output vector $Y_C$, as a subset of output vector Y and physics state vector derivatives $\dot{X}_f$ from OLM 21. The elements of corrector output vector $Y_C$ correspond to particular elements of truth vector $Y_T$.

CMP 23 compares $Y_C$ to the corresponding elements of truth vector $Y_T$, generating corrector errors $E_C$. Corrector errors $E_C$ are combined with solver errors $E_S$ to generate error vector E, which is minimized via MSE 24. Model parameters from OLM 21 are adjusted by corrector vector $U_C$ in order to minimize the difference between corrector outputs $Y_C$ and truth vector $Y^T$, reducing errors between the output of CLM 12 and the actual condition of apparatus 11, as sensed by system sensors 15 and actuator sensors 16.

CLM 12 operates in both an on-board or online mode for real-time control of apparatus 11, and an off-board or offline mode. Off-board applications include system plant representation in control hardware testing environments, transient and steady state simulations to support design activities for system 10 and apparatus 11, and off-board hardware diagnostics to support field maintenance activities. Consequently, the particular pairing of constraint corrector states $U_C$ and corrector outputs $Y_C$ depends upon whether system 10 is operating in on-board or off-board mode. In particular, on-board and off-board sensor configurations often vary. Corrector subset $Y_C$ of model output vector Y varies accordingly, in order to compare with the appropriate suite of sensors corresponding to truth vector $Y_T$.

As defined above, MSE 24 synthesizes physics state vector $X_f$ and constraint input state vector $U_K$ from error vector E and physics state vector derivative $\dot{X}_f$. Specifically, MSE 24 advances vectors $X_f$ and $U_K$ by the CLM cycle time, producing time-advanced physics state vector $X_f^{k+1}$ and time-advanced constraint input state vector $U_K^{k+1}$. The time-advanced vectors are fed back into OLM 21, completing the closed-loop structure of CLM 12.

Vectors $X_f$ and $U_K$ provide complementary utility. Constraint input state vector $U_K$ allows CLM 12 to explicitly predict the elements of state vector $X_f$ in a feed-through (non-iterative) fashion, and to converge on time-advanced physics state vector $X_f^{k+1}$ within a reasonable processing time. This provides a high fidelity model that accurately represents engineering system/apparatus 11, so that control system 10 operates in a reliable, efficient and effective manner.

In general, MSE 24 seeks time-advanced vectors $X_f^{k+1}$ and $U_K^{k+1}$ that minimize error vector E (that is, drive the error toward zero). Typically, MSE 24 also minimizes physics state vector derivative $\dot{X}_f$. Thus MSE 24 generates outputs that minimize its inputs, such that CLM 12 more accurately describes the physical condition of apparatus 11, and such that CLW 13 more quickly, accurately and reliably satisfies the control commands raised by operator I/F 20.

OLM 21 performs a non-iterative (single-pass or feed-through) analysis, in order to generate Y, $\dot{X}_f$ and $E_S$ on a short time scale appropriate for a range of highly responsive dynamical embodiments of apparatus 11. In general, vectors $\dot{X}_f$, E and Y are functions of vectors $X_f$, $U_X$ and $U_K$; that is, $$\dot{X}_f = f_1(U_X, U_K, X_f),\qquad [2]$$

$$E = f_2(U_X, U_K, X_f),\qquad [3]$$

and $$Y = f_3(U_X, U_K, X_f),\qquad [3]$$

where vector Y is the output (or feedback) from CLM 12. Feedback vector Y is used by CLW 13 to direct actuators 14 to position various control elements of apparatus 11, in order to achieve desired behavior. In a fluid based system such as gas-turbine engine, for example, the desired result is safe and efficient steady state and transient operation, which satisfies operational requirements for aircraft propulsion or power generation.

While vectors $U_X$, $U_K$, $X_f$, E and Y perform different functions within CLM 12, in some cases the individual vector elements are related. In particular, for some elements of output vector Y, transformation function $f_3$ takes on a relatively simple one-to-one form, such that output vector Y comprises one or more elements of physics state vector $X_f$. Alternatively, output vector Y is a function of one or more elements of external input vector $U_X$. This allows CLM 12 to perform additional fidelity checks based on truth vector $Y_T$, as described above and below.

MSE 24 generates time-advanced physics state vector $X_f^{k+1}$ and time-advanced constraint input state vector $U_K^{k+1}$ in order to minimize error vector E, physics state vector derivative $\dot{X}_f$, or both. In particular, vector $X_f^{k+1}$ is directed toward minimization of state vector derivative $\dot{X}_f$ and vector $U_K^{k+1}$ is directed toward minimization of error vector E. Furthermore, vector $U_C^{k+1}$ is directed toward minimization of corrector error vector $E_C$, and vector $U_S^{k+1}$ is directed toward minimization of solver error vector E.

Since vector $X_f$ typically has relatively slow dynamic response with respect to the execution speed of CLM 12, the time-advanced form ($X_f^{k+1}$) can be estimated using an appropriate numerical approximation such as the forward rectangle rule. That is, $$X_f^{k+1} = X_f + f_4(X_f, U_X, U_C) \times \Delta T,\qquad [5]$$

where $\Delta T$ is the step time.

A more general result, without assuming any particular numerical integration algorithm, is:

$$X_f^{k+1} = X_f + f_5(X_f, \dot{X}_f, X_f^{-1}, \dot{X}_f^{-1} \ldots),\qquad [6]$$

where the "k−1" superscript denotes time-retarded forms of state vector $X_f$ and state vector derivative $\dot{X}_f$; that is, forms derived in a finite number of previous executions of CLM 12. The ellipses indicate that any number of additionally retarded forms can be utilized.

The additional requirements imposed on vector $U_K$ make the determination of time-advanced form $U_K^{k+1}$ a difficult technical problem. The process is best described by considering a small region around a particular operational point or base point BP, where a linear representation holds to sufficient accuracy. In this region, changes (or differences) in external input vector $U_X$, constraint state vector $U_K$ and physics state vector $X_f$ are defined by:

$$\Delta U_X \equiv U_X - U_X|_{BP},\qquad [7]$$

$$\Delta U_K \equiv U_K - U_K|_{BP},\qquad [8]$$

and $$\Delta X_f \equiv X_f - X_f|_{BP},\qquad [9]$$

where the "$|_{BP}$" subscript indicates evaluation at the location of base point BP.

In a linear approximation, the differences in physics state vector derivative $\dot{X}_f$, error vector E and output vector Y are linear combinations of the differences in vectors $X_f$, $U_K$ and $U_X$. That is, $$\Delta \dot{X}_f \approx A_f^i \cdot \Delta X_f + A_k^i \cdot \Delta U_K + A_x^\theta \cdot \Delta U_X,\qquad [10]$$

$$\Delta E \approx A_f^e \cdot \Delta X_f + A_k^e \cdot \Delta U_K + A_x^e \cdot \Delta U_X,\qquad [11]$$

and $$\Delta Y \approx A_f^y \cdot \Delta X_f + A_k^y \cdot \Delta U_K + A_x^y \cdot \Delta U_X,\qquad [12]$$

Note that Eqs. 10-12 utilize a generalized tensor form, in which the product of tensors $A_j^i$ and vectors $X_f$, $U_K$ and $U_X$ tend to mix or cross-couple contributions from different vector elements. This contrasts with Eqs. 2-6, which are vector equations in which particular scalar functions $f_1$-$f_5$ are applied to individual components of vectors $X_f$, $\dot{X}_f$, E and Y. Eqs. 7-9 are similarly interpretable in terms of individual vector elements.

In linear models, the change in constraint vector $U_K$ can be explicitly calculated, for example by setting the change in the error vector ($\Delta E$) in Eq. 11 to zero. Provided that the inverse of tensor $A_k^e$ is sufficiently definable over the relevant parameter space, this yields:

$$\Delta U_K \approx -[A_k^e]^{-1}(A_f^e \cdot \Delta X_f + A_x^e \cdot \Delta U_X)\qquad [13]$$

For some embodiments of apparatus 11, the number of parameters is relatively small and constraint vector $U_K$ can be directly approximated as a nonlinear function of state vector $X_f$ and input vector $U_X$. For many practical engineering systems, however, the complexity of apparatus 11 limits applicability of Eq. 13. The accuracy of linear representations also decreases with distance from base point BP, and the required execution speed is often impractical because the computational load increases exponentially.

In larger-scale practical engineering systems where the model cycle time (the step size) must be increased to keep up with the processing rate of apparatus 11, nonlinearities must be addressed in a more sophisticated way, which does not yield an impractical processing load. This is accomplished via a combined feed-forward and feedback-based approach to error correction, where feed-forward term $F_F$ is based on time-advanced state vector $X_f^{k+1}$ and time-advanced external input vector $U_X^{k+1}$, and feedback term $F_B$ includes contributions from the accumulated error. That is, $$U_K^{k+1} = U_K^{k+1}|_{BP} + F_F(X_f^{k+1}, U_X^{k+1}) + F_B(\Delta U_K, E, \int E\,dt),\qquad [14]$$

where error integral $\int E\,dt$ is performed over a number of control system time steps. The more general approach of Eq. 14 allows CLM 12 and MSE 24 to address non-linear couplings among the various elements of input vector $U_X$, state vector $X_f$ and error vector E, which affect constraint vector $U_K$ and thus determine overall performance.

Figure 3:
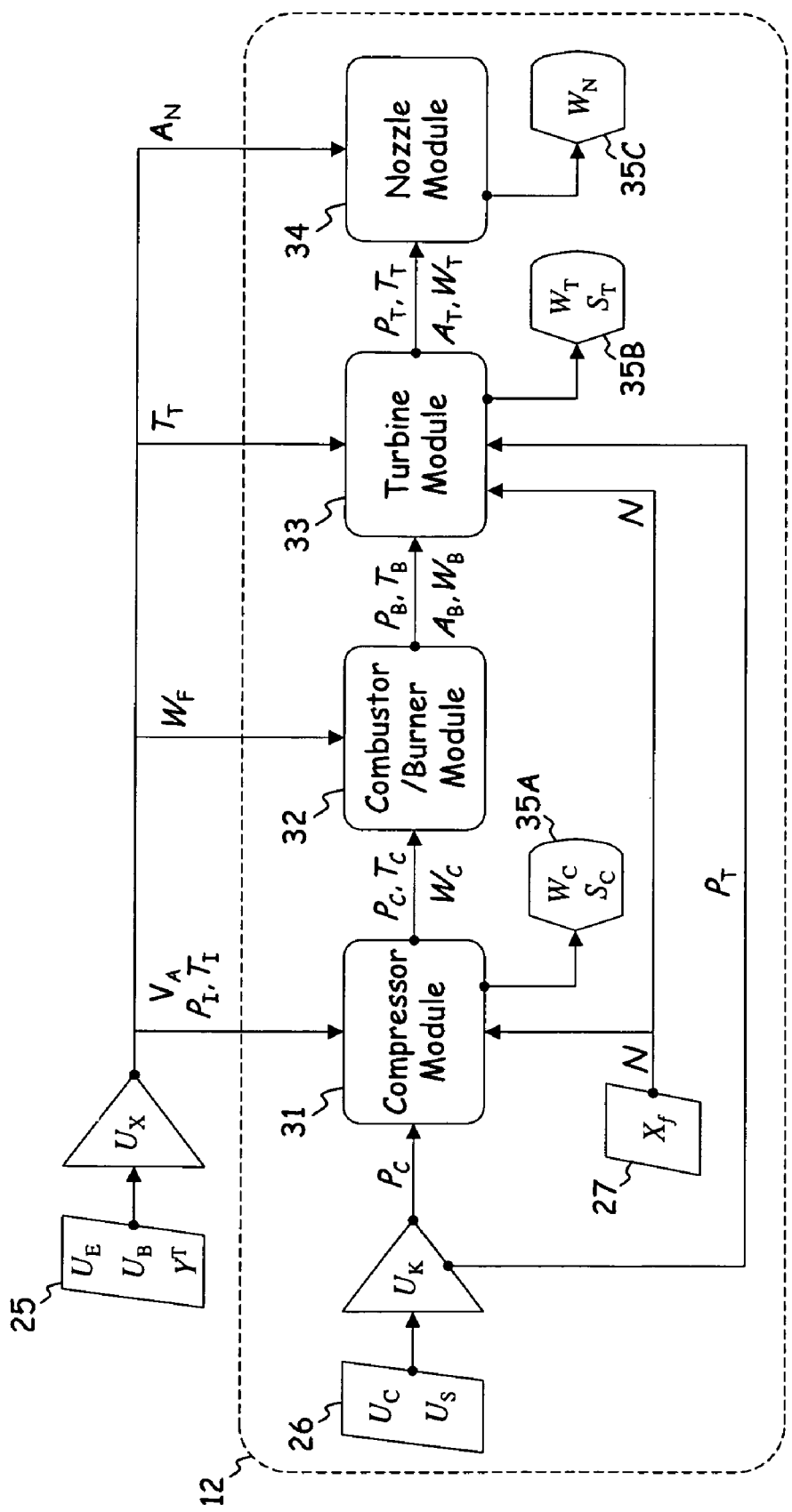
FIG. 3 is a schematic diagram showing the model processor of FIG. 1, as applied to a single-spool turbojet engine.

FIG. 3 is a schematic diagram showing the application of CLM 12 to a single-spool gas turbine engine, as an exemplary embodiment of apparatus 11 in FIG. 1. In this particular embodiment, CLM 12 comprises distinct component modules corresponding to physical engine components, including compressor module 31, combustor/burner module 32, turbine module 33 and exhaust nozzle module 34. In further embodiments, CLM 12 also comprises component modules for additional turbine, turbojet or turbofan elements, including, but not limited to, a coaxially nested spool, an inlet, an outlet, a nozzle, a turbofan, a reduction gearbox, an augmentor assembly, and a forward fan for SVTOL operation.

As shown in FIG. 3, external inputs 25 describe a number of actuator-based and sensor based parameters that are variously categorized as elements of effector vector (or actuator vector) $U_E$, boundary condition vector $U_B$, or truth vector $Y_T$. Some of these categorizations overlap. At compressor module 31, for example, inputs 25 include elements of effector vector $U_E$ that describe vane angle $V_A$ and other variable inlet parameters, and elements of boundary condition vector $U_B$ describe inlet pressure $P_I$ and inlet temperature $T_I$, where the inlet forms an external flow boundary upstream of the compressor. For combustor module 32 and turbine module 33, inputs 25 include components of truth vector $Y_T$ that describe turbine exhaust case (TEC) or turbine exit temperature $T_T$. For nozzle module 34, inputs 25 include elements of actuator vector $U_E$ that describe nozzle area $A_N$ and other variable nozzle parameters.

As described above, constraint input states 26 comprise vectors $U_C$ and $U_S$, which are combined to form constraint input state vector $U_K$. In FIG. 3, for example, vector $U_K$ includes component-specific elements such as compressor outlet pressure $P_C$, as determined at an intermediate location between the compressor corresponding to software module 31, and the combustor corresponding to software module 32. Additional constraint vector components are generated within downstream component modules, for example TEC pressure or turbine exit pressure $P_T$, as determined within a transition flow duct between the physical turbine corresponding to software module 33 and the physical exhaust nozzle corresponding to software module 34.

In the example of FIG. 3, physics state vector 27 ($X_f$) contains an element corresponding to shaft speed N. Shaft speed N is utilized by compressor module 31 and turbine module 33, in order to calculate corresponding module outputs for the model. As with other elements of physics state vector $X_f$, shaft speed N is determined by engineering principles, has relatively slow response time compared to the model time step, and reflects system dynamics that are accurately modeled by CLM 12.

The change in spool speed N depends upon the net power delivered to the shaft:

$$\frac{dN}{dt} = \frac{S_T - S_C}{N \times I}, \quad [15]$$

where $S_T$ and $S_C$ are the power output from turbine module 33 and the power input to compressor module 31, respectively, and I is the moment of inertia of the shaft or spool.

Component modules 31, 33 and 34 produce model outputs 35A, 35B and 35C, which are a representative subset of the model outputs used to form relationships between vectors $X_f$ and $\dot{X}_f$, and between vectors $U_K$ and E. Compressor module output 35A, for example, includes compressor flow rate $W_C$ and power demand $S_C$. Turbine module output 35B includes turbine flow rate $W_T$ and power output $S_T$, and nozzle output 35C includes nozzle flow rate $W_N$. Additional outputs include various gas path temperatures, gas path pressures and specific corrector outputs $Y_C$, such as turbine exit temperature $T_T$. Corrector outputs $Y_C$ are compared to specific elements of truth vector $Y_T$, in order to generate errors (specifically, corrector errors $E_C$), and CLM 12 reduces the errors to enhance model fidelity and response.

The elements of constraint vector $U_K$ are divided into constraint corrector states $U_C$, which are utilized to correct subset $Y_C$ of outputs Y (that is, to minimize corrector error $E_C$), and constraint solver states $U_S$, which are used to minimize solver errors $E_S$. Vector $U_C$ includes adjustable (empirical) parameters, while constraint solvers $U_S$ are based on established rules of engineering and essentially inviolable laws of physics.

Applying control volume mass conservation law, it can be shown that the time rate of change in turbine module 33 exit pressure $P_T$, for example, depends upon ideal gas constant R, temperature $T_T$ and rate of flow into $(W_T)$ and out of $(W_N)$ volume $V_T$, as defined between the physical turbine and nozzle components corresponding to software modules 33 and 34, respectively:

$$\frac{dP_T}{dt} = \frac{RT_T}{V_T} \times (W_T - W_N). \quad [16]$$

Eq. 16 also related to the error in turbine flow:

$$E_S(W_T) = \frac{RT_T}{V_T} \times (W_T - W_N). \quad [17]$$

In general, corrector errors $E_C$ depend upon the difference between the elements of corrector output vector $Y_C$ and the corresponding elements of truth vector $Y_T$. For turbine temperature $T_T$, for example, the appropriate element is:

$$E_C(T_T) = Y_C(T_T) - Y_T(T_T). \quad [18]$$

That is, the corrector error element corresponding to temperature $T_T$ is the difference between the turbine exit temperature as modeled by turbine module 33, and the corresponding element of truth vector $Y_T$. Depending on application, this element is sometimes an actual measurement from a physical sensor located in the core flow proximate the turbine exit assembly, and sometimes a high fidelity model output, which is accepted as accurate.

In general, particular constraint state parameters are utilized in a number of different forms, including both physics engineering relationships and empirical associations, in order to minimize error corrector $E_C$ and error solver $E_S$. Further, Eqs. 16-18 are not limited in application to the turbine/nozzle interface, but can be applied to any control volume at any flow transition, including transitions between the physical components corresponding to compressor module 31, combustor/burner module 32 and turbine module 33, or between an exhaust nozzle and an augmentor or afterburner assembly. At the same time, changes in one constraint parameter will necessarily influence a number of different errors, state vectors and model outputs. This makes stable error correction a high priority for fast, accurate and robust modeling and control systems.

Figure 4:
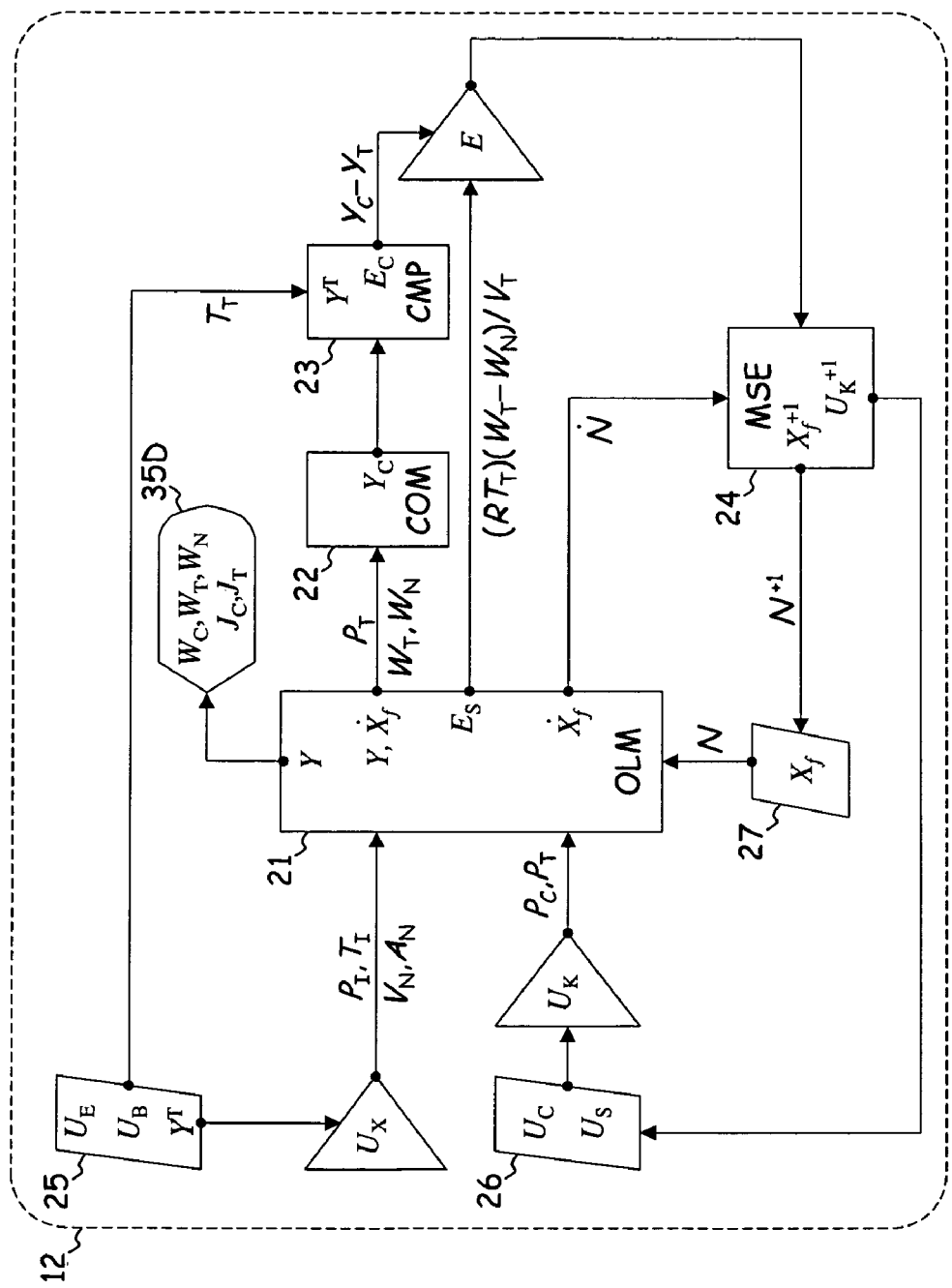
FIG. 4 is a schematic diagram illustrating an error minimization mechanism for the model processor of FIG. 1.

FIG. 4 is a schematic diagram illustrating an error minimization mechanism for CLM 12. CLM 12 is processor-based model comprising OLM 21, COM 22, CMP 23, and MSE 24, as described above. CLM 12 operates on inputs 25 and generates outputs 35D, which combine modular outputs 35A, 35B and 35C of FIG. 3.

As shown in FIG. 4, inputs 25 to CLM 12 describe boundary conditions such as inlet pressure $P_I$ and inlet temperature $T_I$, and control states of apparatus 11, such as variable vane and nozzle configurations $V_A$ and $A_N$. These are input directly to OLM 21, while truth states such as turbine exit temperature $T_T$ are also input to CMP 23.

Typically, the inputs to OLM 21 are delivered to one or more individual component-level software modules, such as compressor module 31, combustor/burner module 32, turbine module 33 and exhaust nozzle module 34 of FIG. 3, above. In turn, each of the component-level software modules utilizes processor components that perform the module-level functions of OLM 21, COM 22, CMP 23 and MSE 24.

Constraints 26 comprise vectors $U_C$ and $U_S$, which are combined to form vector $U_K$. Constraint state vector $U_K$ includes component-specific elements such as compressor outlet pressure $P_C$, as determined at an intermediate location between the compressor and combustor. Additional constraint vector components are generated by downstream component modules, for example turbine exit pressure $P_T$, as determined within a transition flow duct between the turbine section and the exhaust nozzle.

The elements of constraint vector $U_K$ describe component-specific elements such as compressor outlet pressure $P_C$ and turbine outlet pressure $P_T$. Constraint correctors $U_C$ are utilized to improve the accuracy of corrector outputs (modeled values) $Y_C$ at COM 22, which correspond to truth (measured or high fidelity modeled) values $Y_T$, for instance the "true" value of turbine exit temperature $T_T$. This minimizes corrector errors $E_C$, as determined by CMP 23. Constraint solver states $U_S$ are utilized to minimize solver errors $E_S$, including the error in turbine flow parameters as described above.

Physics state vector 27 ($X_f$) comprises elements describing physics states of the apparatus, including spool speed N. OLM 21 determines the time rate of change in spool speed ($\dot{N}$) and other state vector elements, based on physics and engineering principles such as moment of inertia and net power delivered to the shaft.

Model state estimator (MSE) 24 generates time-advanced physics state vector $X_f^{k+1}$ and time-advanced constraint vector $U_K^{k+1}$ for feedback into OLM 21, such that state vector derivatives $\dot{X}_f$ and error vector E are driven toward zero (that is, minimized). This allows CLM 12 to quickly, accurately and reliably model the physical apparatus, ensuring fast response and high fidelity control.

In order to achieve these goals, MSE 24 must predict (or estimate) future model state values with some degree of accuracy, in order to reduce the magnitude of error vector E. In particular, MSE 24 must be able to accurately formulate the feedback term $F_B$ in Eq. 14, and must employ a gain design scheme that addresses cross-dependencies among the different elements of constraint vector $U_K$ and error vector E.

There are two basic approaches to gain design, depending upon how strong the cross-dependencies are. In the single-input, single-output (SISO) approach, distinct elements of error vector E are closely associated with distinct elements of constraint vector $U_K$, and not substantially cross-correlated, so gain formulation can be decoupled for each individual element. In the multiple-input, multiple-output (MIMO) approach, error vector E and constraint vector $U_K$ are substantially cross-correlated with one another, and the problem is not decoupled. The MIMO approach is further divided into control and observer formulations, as described below.

The SISO approach applies when distinct components of error vector E are closely associated or paired with distinct components of constraint vector $U_K$. In this case, tensors $A^i_j$ in Eqs. 10-12 take on substantially diagonal form, with relatively small-magnitude off-diagonal elements. Alternatively, the SISO approach applies when there is one-way coupling. In this case, tensors $A^i_j$ have substantially triangular form, in which the elements on one side of the diagonal are zero, or at least small as compared to elements on the other side of the diagonal.

In SISO embodiments, the feedback contribution in Eq. 14 is approximated by the following single-input, single-output model state estimator equation:

$$U_K^{k+1} = U_K^{k+1}|_{BP} + S(X_f, U_X, U_K, Y) \cdot E \times \Delta T. \quad [19]$$

Essentially, Eq. 19 provides a difference equation (or a set of difference equations) for obtaining time-advanced constraint vector $U_K^{k+1}$. The difference equations define the change in time-advanced constraint vector $U_K^{k+1}$ from its value at base point BP, in terms of the tensor product of gain matrix S and error vector E, scaled by time step $\Delta T$.

In the decoupled case, gain tensor S is substantially diagonal; that is, each element of time-advanced constraint vector $U_K^{k+1}$ is associated with exactly one element of error vector E, and is not closely associated with the others. In this case, the estimation process for time-advanced constraint state vector $U_K^{k+1}$ is simply repeated for each set of paired elements. Because the mapping from constraint vector $U_K^{k+1}$ to error vector E is substantially one-to-one, the computations are independent and can be performed in any order.

CLM 12 utilizes non-linear approximations, such that the particular form of gain tensor S varies as a nonlinear function of input vectors $X_f$, $U_X$, $U_K$ and Y. In addition, the gain design process is repeated over a rich set of inputs, representing the full operational envelope of each individual vector element. The elements of gain tensor S are then determined on the basis of model fidelity, control response, and stability over the entire operational range.

During the gain design process, additional correlations typically appear between elements of constraint vector $U_K$ and elements of error vector E. To the extent that these additional cross-couplings are small, the SISO estimator approach holds and it is sufficient to approximate gain tensor S with a substantially diagonal or substantially triangular form. To the extent that these additional cross-couplings are not small, the SISO approximation does not hold and multiple-input, multiple-output (MIMO) design approach is employed.

In the MIMO embodiment, MSE 24 utilizes a twofold design approach in which a linear analysis is used to formulate initial gain parameters (that is, to estimate the gain tensor elements), followed by derivation of a model state estimator difference equation analogous to Eq. 19, above, but using a gain integral to accommodate additional cross-couplings. There are two basic approaches to the MIMO gain design equation, which are known as control formulation and observer formulation.

In the control formulation approach, the elements of error vector E are assumed to depend upon the time derivative of an unknown state vector $X_d$. That is, $$\Delta E = \Delta \frac{dX_d}{dt}, \quad [20]$$

where unknown state vector $X_d$ is also referred to as the solution state vector. The solution state vector derivative is $$\dot{X}_d \equiv \frac{dX_d}{dt}, \qquad [21]$$

which is analogous to the definition of state vector derivative $\dot{X}_f$ above. Augmented state vector X includes both known (or predefined) physics state vector $X_f$ and additional unknown (MSE-defined) components $X_d$:

$$X \equiv \begin{bmatrix} X_f \\ X_d \end{bmatrix}. \qquad [22]$$

The control formulation views constraint vector $U_K$ as a control input. The change in $U_K$ depends upon augmented state vector X through a multiple-input, multiple-output (MIMO) gain function, which is expressed in matrix form as gain tensor M. That is, $$\Delta U_K = -M \cdot \Delta X, \qquad [23]$$

where M is the MIMO gain tensor in the control formulation. Note that this approach also requires augmentation of constraint vector $U_K$ and MIMO gain tensor M, for example $$M = [M_f \ M_d] \qquad [24],$$

where submatrices $M_f$ and $M_d$ are associated with physical state vector $X_f$ and solution vector $X_d$, respectively.

Gain design seeks gain tensor M that allows MSE 24 to direct solution state vector $X_d$ toward quick and reliable minimization of error vector E, which in turn achieves stability and fidelity for CLM 12 and facilitates stable and accurate control response for system 10. A general form for estimating time-advanced (augmented) state vector $X^{k+1}$ is based on the forward rectangular rule for integral approximation:

$$\Delta X^{k+1} = \Delta X + \dot{X} \times \Delta T. \qquad [25]$$

In this expression, the augmented state vector derivative $$\dot{X} \equiv \frac{dX}{dt} \qquad [26]$$

is determined by functions of external input vector $U_X$, constraint vector $U_K$, state vector $X_f$ and solution states $X_d$. That is, $$\Delta \dot{X} = \begin{bmatrix} f_1(U_X, U_K, X_f) \\ f_2(U_X, U_K, X_f) \end{bmatrix}. \qquad [27]$$

MIMO gain tensor M is defined as a function of the time rate of change in the augmented state vector:

$$\dot{X} = \left\{ \begin{bmatrix} A_f^f & 0 \\ A_d^f & 0 \end{bmatrix} - \begin{bmatrix} A_f^d \\ A_d^d \end{bmatrix} \cdot [M_f \ M_d] \right\} \cdot \Delta X + B \cdot \Delta U_X, \qquad [28]$$

where the first term defines dynamic matrix A:

$$A \equiv \begin{bmatrix} A_f^f & 0 \\ A_d^f & 0 \end{bmatrix} - \begin{bmatrix} A_f^d \\ A_d^d \end{bmatrix} \cdot [M_f \ M_d]. \qquad [29]$$

Gain tensor M is sized to place eigenvalues of dynamic matrix A in order to meet the overall stability and transient fidelity requirements of CLM 12. Essentially, dynamic matrix A concerns the physical, engineering, empirical and other dynamical relationships that determine time derivative $\dot{X}$ of augmented state vector X, and gain tensor M determines the appropriate gain or multiplicative factor to be applied to each relationship.

Time-advanced constraint vector $U_K^{k+1}$ is defined analogously:

$$\Delta U_K^{k+1} = -M \cdot \Delta X^{k+1}. \qquad [30]$$

In some embodiments, solution states $X_d$ are decoupled from physical states $X_f$, such that the solution vector and physical state vector are well separated in terms of the bandwidth (the respective bounds in the frequency domain). In these embodiments, independent forms are obtained for solution states $X_d$:

$$\Delta X_d^{k+1} = \Delta X_d + \frac{dX_d}{dt} \times \Delta T, \qquad [31]$$

$$\Delta \dot{X}_d = f_d(U_X, U_K, X_f), \qquad [32]$$

and $$\Delta U_k^{k+1} = -M_d \cdot \Delta X_d^{k+1}. \qquad [33]$$

Eqs. 31-33 are directly programmable into CLM processor 12, in order to produce control formulation-based model state estimation.

In the observer formulation approach, an assumption is made that constraint vector $U_K$ is the unknown or solution state $X_d$, and that its time derivative is zero. That is, $$\Delta U_K = \Delta X_d \qquad [34]$$

and $$\Delta \dot{U}_K = 0. \qquad [35]$$

Applying linear observer methodology, the following estimator is constructed to drive error vector E to zero:

$$\begin{bmatrix} \Delta \dot{X}_f \\ \Delta \dot{X}_d \end{bmatrix} = \begin{bmatrix} A_f^f & A_c^f \\ 0 & 0 \end{bmatrix} \cdot \begin{bmatrix} \Delta X_f \\ \Delta X_d \end{bmatrix} + \begin{bmatrix} B_f^x \\ 0 \end{bmatrix} \cdot \Delta U_X - \begin{bmatrix} L_f \\ L_d \end{bmatrix} \cdot E, \qquad [36]$$

where $L_f$ and $L_d$ are the sub-matrices of gain tensor L in the MIMO observer formulation. In augmented form, this is:

$$\Delta \dot{X} = A \cdot \Delta X + B \cdot \Delta U_X - L \cdot E, \qquad [37]$$

or, in gain design form:

$$\begin{bmatrix} \Delta \dot{X}_f \\ \Delta \dot{X}_d \end{bmatrix} = \qquad [38]$$

$$\left\{ \begin{bmatrix} A_f^f & A_c^f \\ 0 & 0 \end{bmatrix} - L \cdot [A_d^f \ A_d^c] \right\} \cdot \begin{bmatrix} \Delta X_f \\ \Delta X_d \end{bmatrix} + \left\{ \begin{bmatrix} B_x^f \\ 0 \end{bmatrix} - L \cdot B_x^d \right\} \cdot \Delta U_X,$$

where the first term in curly braces is the dynamic tensor. Gain tensor L is sized to place eigenvalues of the dynamic tensor in order to meet the overall stability and transient fidelity requirements of CLM 12.

The resulting difference equations for augmented state vector X are:

$$\Delta X^{k+1} \equiv \Delta X + \Delta \dot{X} \times \Delta T, \quad [39]$$

as above, and $$\begin{bmatrix} \Delta \dot{X}_f \\ \Delta \dot{X}_d \end{bmatrix} = \begin{bmatrix} f_1(U_X, U_K, X_f) \\ 0 \end{bmatrix} - \begin{bmatrix} L_f \\ L_d \end{bmatrix} \cdot f_2(U_X, U_K, X_f). \quad [40]$$

When the physics states are excluded from the observer formulation, solution vector $X_d$ decouples in the model state estimator difference equation. This yields:

$$\Delta X_d^{k+1} = \Delta X_d - L_d \cdot f_2(U_X, U_K, X_f) \times \Delta T \quad [41]$$

and $$\Delta \dot{X} = \Delta - L_d \cdot f_2(U_X, U_K, X_f). \quad [42]$$

Again, Eqs. 39-42 are directly programmable into CLM processor 12, in the observer-based embodiment of MIMO model state estimation.

Figure 5:
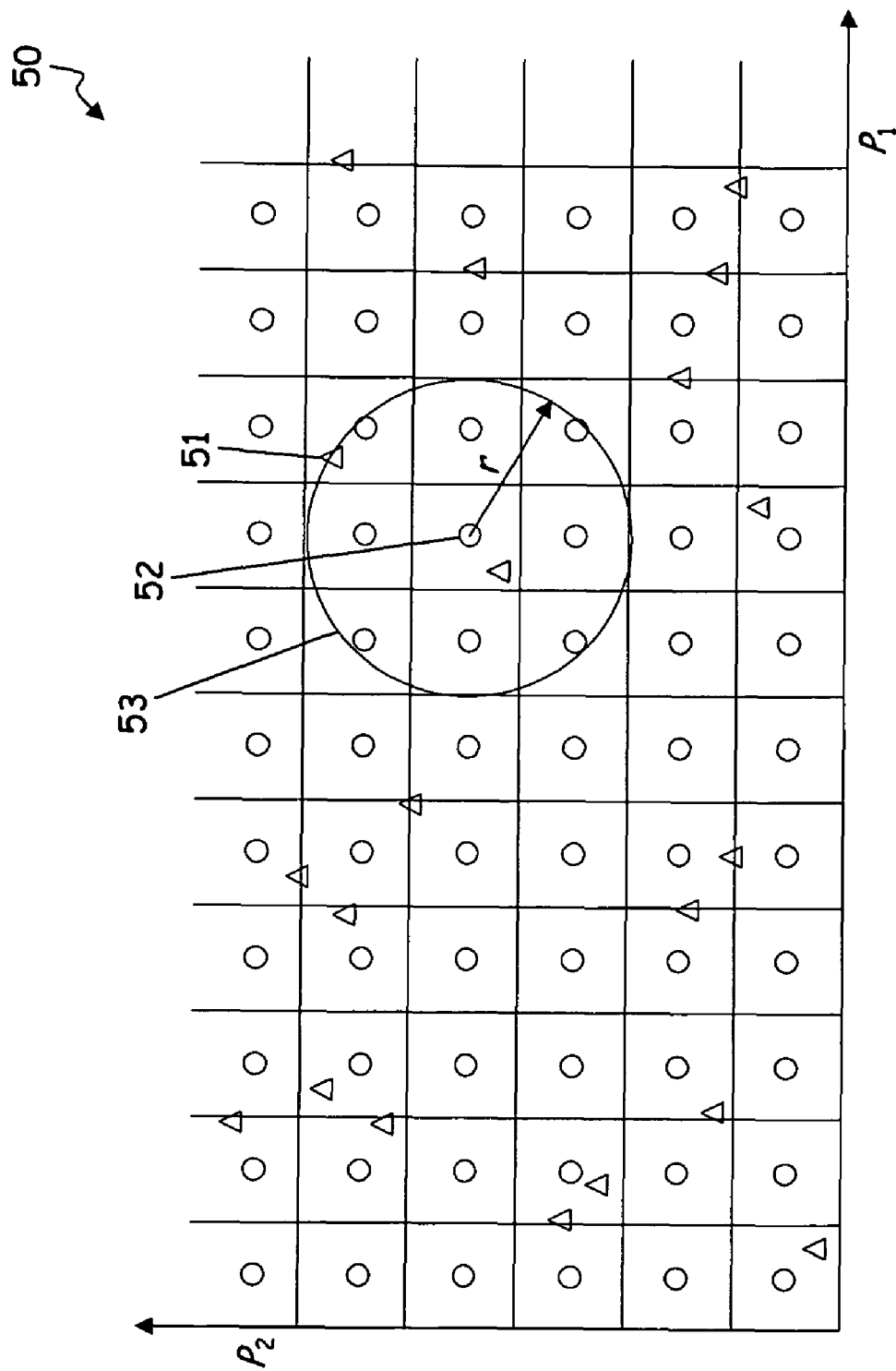
FIG. 5 is a two-dimensional plot of scheduling parameters, illustrating gain design processes for the model processor of FIG. 1.

FIG. 5 is a two-dimensional plot (50) of scheduling parameters $P_1$ and $P_2$, illustrating the gain design process. Gain design comprises a number of steps, including, but not limited to: selecting an optimum set of scheduling parameters, defining a data set, synthesizing an optimum base point system, linearization, scaling, and gain sizing.

Optimum scheduling parameters are determined on the basis of unique criteria including base point field coverage, independence, surface smoothness, variability validity, and gain margin statistics. The criteria are evaluated both with respect to the gain parameters themselves, and with respect to vector derivatives such as $dE/dU_K$.

Typical candidate scheduling parameters include elements of external input vector $U_X$, constraint vector $U_K$, state vector $X_f$, output vector Y or error vector E that sufficiently define the apparatus to allow effective gain scheduling. Alternatively, the scheduling parameters incorporate elements of augmented vectors such as augmented state vector X, or other parameters not contained in the augmented vectors, but which nonetheless provide for effective gain scheduling.

Plot 50 illustrates a bi-variant or two-dimensional approach with two arbitrary scheduling parameters $P_1$ and $P_2$, plotted against each other with first parameter $P_1$ on the horizontal and second parameter $P_2$ on the vertical. Typically, engineering complexity requires at least two scheduling parameters, and no more than two parameters are used when sufficient to effectively design the gain, in order to reduce computational requirements. Alternatively, a one-dimensional (univariant) approach is used, or a multi-variant (multi-dimensional) approach.

Scheduling parameters $P_1$ and $P_2$ are defined for steady state and transient operational conditions spanning a rich data set of design, off-design and failure conditions. A linear space representation is obtained at each design point, applying various linearization techniques to accurately predict system behavior in the vicinity of each data point 51 (triangles). Linearization is verified by a step-response time domain analysis or other validation process, which is applied to a subset of the design data points.

Linear system variables are scaled by maximum values, to improve accuracy of numerical tensor operations during gain design. Correcting linear system variables improves effectiveness of MSE, when operating at non-standard boundary conditions. Scaled and corrected linear models are then used in the gain design process.

The linear representation and gain size vary between points of the design data set. An optimum base point system is synthesized, where each base point 52 (circles) contains a complete specification of the linear system. The operating envelope is covered by a finite number of base points, each defined with scheduling parameters $P_1$ and $P_2$, or another set of scheduling parameters. This results in a rectangular grid of base points 52, forming a base point field than spans the relevant scheduling parameter range.

A linear state space representation is synthesized at each base point 52, from a finite number of design data points located in close proximity to the base point. Proximity is defined by base point cloud 53, with radius r selected as an optimization parameter. One approach utilizes a weighted average of data points 51 located within base point cloud 53. The weighting factor is defined, for example, as a function of the non-dimensional distance between base point 52 and data point 51.

The gain is sized for each system of base points 52, and the discrete model state estimator obtains values of the gain at each time step by interpolating between the base points. That is, the field of optimized base points 52 provides a "lookup table" from which the gains can be interpolated, so that the elements of gain matrices S, M and L can be rapidly and effectively determined as functions of scheduling parameters $P_1$ and $P_2$.

The present invention has been described with reference to preferred embodiments, but the terminology used is for the purposes of description, not limitation. Workers skilled in the art will recognize that changes may be made in form and detail without departing from the spirit and scope of the invention.

The invention claimed is:

1. A control system comprising:
    an actuator for positioning a control device comprising a control surface, wherein the actuator positions the control surface in order to control a model state and wherein the model state describes a spool speed;
    a control law for directing the actuator as a function of a model output, and
    a closed-loop model processor for generating the model output, the closed-loop model processor comprising:
        an open loop module for generating the model output as a function of the model state, a constraint on the model state and a model input, wherein the constraint on the model state is based on flow continuity;
        a corrector output module for generating a corrector output as a function of the model output;
        a comparator for generating an error by comparing the corrector output to the model input; and
        a model state estimator for generating the model state as a function of the error, such that the error is minimized;
    wherein the spool speed has a response time greater than a cycle time of the closed-loop model processor.

2. The control system of claim 1, wherein the control device comprises a variable-position control surface positioned in a working fluid flow.

3. The control system of claim 2, wherein the model input describes a boundary flow condition at one of an inlet or an outlet of the working fluid flow.

4. The control system of claim 3, wherein the variable-position control surface comprises one of a variable-position vane surface or a variable-position nozzle surface positioned in the working fluid flow.

5. The control system of claim 1, wherein the model state estimator further generates the model state as a function of the error, such that a time derivative of the model state is minimized.

6. The control system of claim 1, wherein a cycle time of the closed-loop model processor is 50 ms or less.

7. The control system of claim 1, wherein the closed-loop model processor is non-iterative, such that the open loop module, the corrector output module, the comparator and the model state estimator each utilize non-iterative functions to generate the model output, the corrector output, the error and the model state.

8. The control system of claim 7, wherein the closed-loop model processor is further non-linear, such that at least one of the open loop module, the corrector output module, the comparator and the model state estimator utilizes a non-linear function to generate at least one of the model output, the corrector output, the error and the model state.

9. A method for controlling flow through an apparatus, the method comprising:
sensing, by a sensor, a boundary state describing the flow at a boundary of the apparatus;
controlling, by a control device, an actuator state as a function of a model feedback, wherein the actuator state describes a variable control surface positioned in the flow;
generating, by a processor, the model feedback as a function of the boundary state and the actuator state and a physical state of the apparatus;
correcting, by the processor, the model feedback for error based on the boundary state; and
estimating, by the processor, the physical state by minimizing the error, such that the flow is controlled;
wherein the physical state comprises a steady state of the apparatus, and wherein the steady state has a response time greater than a cycle time of the method.

10. The method of claim 9, wherein the boundary state describes the flow at one of an inlet boundary of the apparatus or an outlet boundary of the apparatus.

11. The method of claim 10, wherein the actuator state describes one of a variable vane position proximate the inlet boundary or a variable nozzle position proximate the outlet boundary.

12. The method of claim 9, further comprising minimizing a time rate of change of the physical state.

13. The method of claim 12, wherein the physical state comprises a rotational state.

14. The method of claim 12, wherein estimating the physical state is performed as a function of a gain tensor designed to minimize the error and the time rate of change of the physical state.

15. The method of claim 14, wherein the gain tensor has a substantially triangular representation.

16. The method of claim 9, further comprising estimating, by the processor, a constraint state by minimizing the error, wherein the constraint state describes a flow continuity constraint on the physical state.

17. The method of claim 16, wherein generating the model feedback is performed as nonlinear, non-iterative function of the boundary state, the actuator state, the physical state and the constraint state.

18. The method of claim 16, wherein minimizing the error is performed as nonlinear, non-iterative function of the boundary state, the actuator state and the constraint state.

19. A system for controlling a rotational state of an apparatus, the system comprising:
a sensor for sensing a boundary state of the apparatus, wherein the boundary state describes flow through the apparatus at one of an inlet boundary of the apparatus and an outlet boundary of the apparatus;
an actuator for changing a control state within the apparatus, in order to alter the boundary state;
a output module for generating an output vector as a function of an input vector, a constraint vector and the rotational state, wherein the input vector describes the boundary state of the apparatus and the control state within the apparatus, and wherein the constraint vector describes the flow at an intermediate location between the inlet boundary and the outlet boundary;
a comparator for generating an error vector by comparing the output vector to the input vector;
an estimator for estimating the rotational state by minimizing the error vector, wherein the estimator further estimates the constraint vector and the constraint vector constrains the rotational state based on flow continuity, and wherein the estimator minimizes the error vector based on a tensor function of a gain matrix; and
a controller for controlling the actuator based on the output vector, such that the system controls the rotational state of the apparatus.

20. The system of claim 19, wherein the output module further generates a time derivative of the rotational state, and wherein the estimator further estimates the rotational state by minimizing the time derivative.

21. The system of claim 19, wherein the rotational state of the apparatus describes a spool speed for a gas turbine engine.

22. The system of claim 19, wherein the gain matrix has a substantially triangular form.

23. The system of claim 19, wherein the gain matrix is based on a control formulation in which the error vector is defined as a time derivative that is decoupled from the rotational state.

24. The system of claim 19, wherein the gain matrix is based on an observer formulation in which a time derivative of the constraint vector is zero.

25. The system of claim 19, wherein the output module generates the output vector as a nonlinear, non-iterative function of the input vector, the rotational state and the constraint vector, and wherein the estimator estimates the rotational state by minimizing the error vector based on a nonlinear, non-iterative function of the input vector and the constraint vector.

* * * * *